United States Patent
Hardee et al.

(10) Patent No.: US 10,538,239 B2
(45) Date of Patent: Jan. 21, 2020

(54) ADAPTING DRIVING BASED ON A TRANSPORTED CARGO

(71) Applicant: International Business Machines Corporation, Armonk, NY (US)

(72) Inventors: Christopher J. Hardee, Raleigh, NC (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 251 days.

(21) Appl. No.: 15/661,681

(22) Filed: Jul. 27, 2017

(65) Prior Publication Data
US 2019/0031186 A1    Jan. 31, 2019

(51) Int. Cl.
*G05D 1/00* (2006.01)
*B60W 30/02* (2012.01)
*G05B 13/02* (2006.01)

(52) U.S. Cl.
CPC ........... *B60W 30/02* (2013.01); *G05B 13/024* (2013.01); *G05D 1/0088* (2013.01); *B60W 2400/00* (2013.01)

(58) Field of Classification Search
CPC . B60W 30/02; B60W 2400/00; G05B 13/024; G05D 1/0088
USPC .......................................................... 701/27
See application file for complete search history.

(56) References Cited

U.S. PATENT DOCUMENTS

| | | |
|---|---|---|
| 7,991,505 B2 | 8/2011 | Lert, Jr. et al. |
| 8,634,980 B1 | 1/2014 | Urmson et al. |
| 2008/0059007 A1 | 3/2008 | Whittaker et al. |
| 2009/0058593 A1 | 3/2009 | Breed |
| 2015/0006005 A1 | 1/2015 | Yu et al. |
| 2015/0158486 A1 | 6/2015 | Healey et al. |
| 2016/0019497 A1* | 1/2016 | Carvajal ............... G06Q 10/08 701/519 |
| 2016/0185503 A1 | 6/2016 | Balwani |
| 2016/0288687 A1 | 10/2016 | Scherle et al. |
| 2017/0351255 A1* | 12/2017 | Anderson ............ G05D 1/0214 |

FOREIGN PATENT DOCUMENTS

JP    56082910 A    7/1981

OTHER PUBLICATIONS

Daigh et al. "Autonomous Self Guided Ground Transport Vehicles for Hazardous Environmental Remediation," AUVSI '96 Proceedings, 1996, pp. 607-617.

(Continued)

*Primary Examiner* — Gertrude Arthur Jeanglaude
(74) *Attorney, Agent, or Firm* — Cantor Colburn LLP; David Zwick

(57) ABSTRACT

A method includes determining, by an electronic control unit, at least one characteristic of cargo that is transported by an autonomous vehicle or a semi-autonomous vehicle. The method also includes determining a driving adaptation based at least on the at least one characteristic. The driving adaptation is selected from the group including a routing adaptation, a driving style adaptation, and an internal control adaptation. The method also includes configuring the vehicle to transport the cargo based at least on the determined driving adaptation.

20 Claims, 6 Drawing Sheets

(56) References Cited

OTHER PUBLICATIONS

Hirsch, J. (Aug. 18, 2016) "Uber Acquires Otto Self-Driving Truck Startup, Signs Volvo Deal," Retrieved from https://www.trucks.com/2016/08/18/uber-acquires-otto-self-driving-truck-startup/, 15 pages.
Roberts, D. (Aug. 3, 2016) "1.8 million American truck drivers could lose their jobs to robots. What then?," Retrieved from http://www.vox.com/2016/8/3/12342764/autonomous-trucks-employment, 8 pages.

* cited by examiner

ADAPTING DRIVING BASED ON A TRANSPORTED CARGO

BACKGROUND

The present invention generally relates to autonomous and semi-autonomous vehicles. More specifically, the present invention relates to adapting a driving style, a driving route, and/or an internal control of an autonomous vehicle or a semi-autonomous vehicle based at least in part on a cargo that is being transported by the vehicle.

An autonomous vehicle is a vehicle that is capable of detecting characteristics of its surroundings and capable of driving though the surroundings without a human driver. Autonomous vehicles can be configured to detect characteristics of the environment using, for example, computer vision, global positioning systems, radar technologies, and/or laser technologies. Autonomous vehicles avoid collisions with neighboring vehicles by anticipating the movements of the neighboring vehicles and by adaptively reacting to the anticipated movements. A semi-autonomous vehicle is a vehicle that utilizes automation for certain aspects of driving while relying upon a human driver for other aspects of driving.

SUMMARY

Embodiments of the present invention are directed to a computer-implemented method for controlling an autonomous vehicle or a semi-autonomous vehicle. A non-limiting example of the computer-implemented method includes determining, by an electronic control unit, at least one characteristic of cargo that is transported by an autonomous vehicle or a semi-autonomous vehicle. The method also includes determining a driving adaptation based at least on the at least one characteristic. The driving adaptation is selected from the group including a routing adaptation, a driving style adaptation, and an internal control adaptation. The method also includes configuring the vehicle to transport the cargo based at least on the determined adaptation.

Embodiments of the present invention are directed to a system for controlling an autonomous vehicle or a semi-autonomous vehicle. A non-limiting example of the system includes a memory. The system also includes a processor system communicatively coupled to the memory. The processor system is configured to perform a method including determining at least one characteristic of cargo that is transported by an autonomous vehicle or a semi-autonomous vehicle. The method also includes determining a driving adaptation based at least on the at least one characteristic. The driving adaptation is selected from the group including a routing adaptation, a driving style adaptation, and an internal control adaptation. The method also includes configuring the vehicle to transport the cargo based at least on the determined adaptation.

Embodiments of the invention are directed to a computer program product for controlling an autonomous vehicle or a semi-autonomous vehicle. The computer program product includes a computer readable storage medium having program instructions embodied therewith. The program instructions are executable by a processor to cause the processor to perform a method. A non-limiting example of the method includes determining at least one characteristic of cargo that is transported by an autonomous vehicle or a semi-autonomous vehicle. The method also includes determining a driving adaptation based at least on the at least one characteristic. The driving adaptation is selected from the group consisting of a routing adaptation, a driving style adaptation, and an internal control adaptation. The method also includes configuring the vehicle to transport the cargo based at least on the determined driving adaptation.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
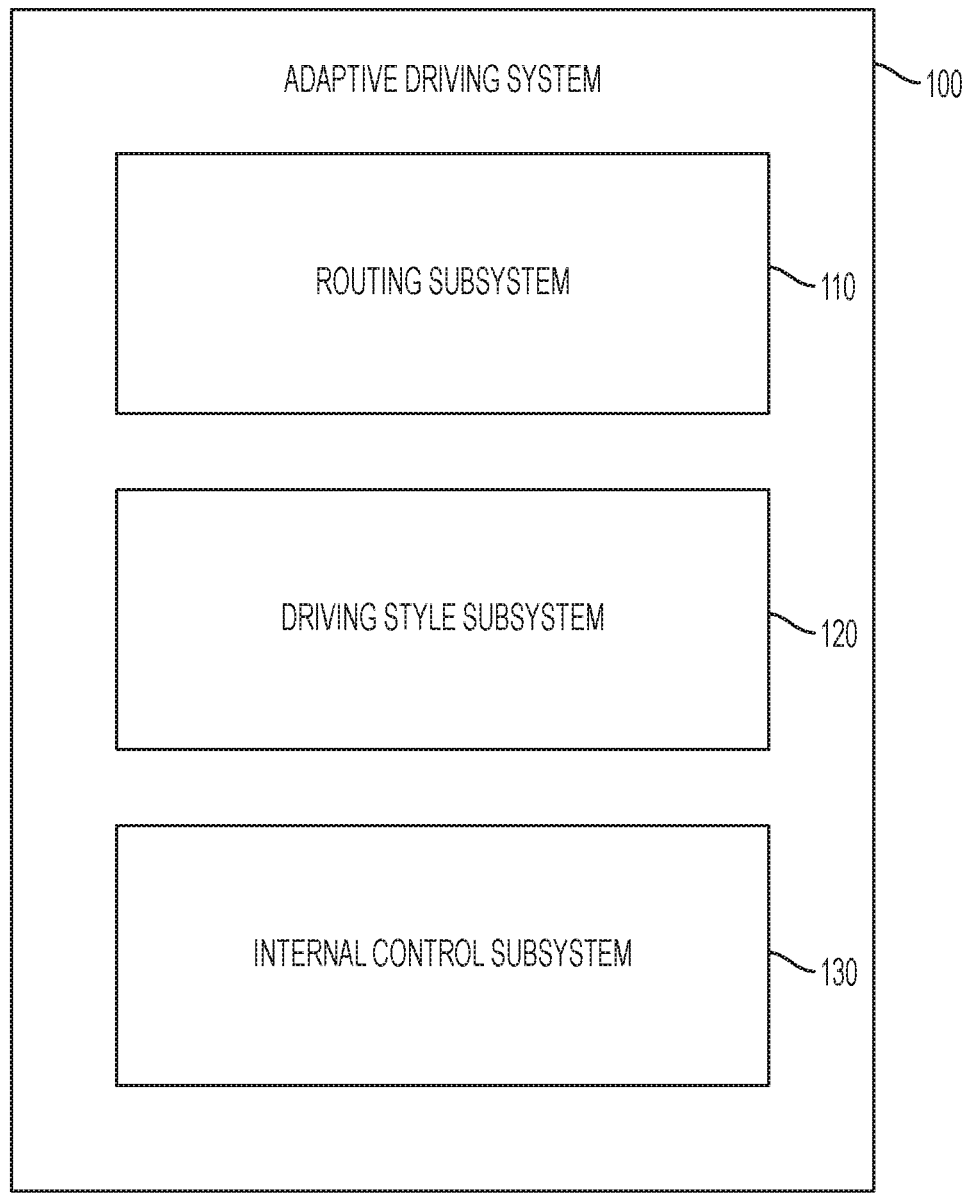
FIG. 1 depicts an adaptive driving system in accordance with one or more embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that is more specifically relevant to aspects of the invention, vehicles that transport cargo are expected to adopt self-driving technology sooner than other types of vehicles. With the adoption of self-driving technology, cargo-transporting vehicles can autonomously transport cargo without needing to stop travel to allow human drivers to rest. As such, by using self-driving technology, the cargo-transporting vehicles can provide faster delivery of the cargo while also reducing instances of accidents. Further, cargo-transporting vehicles that operate autonomously or semi-autonomously can also operate in accordance with a more predictable schedule.

When using autonomous or semi-autonomous vehicles to transport cargo, there can be circumstances where a vehicle should make driving/routing decisions based at least in part on a type of cargo that is being transported. The type of cargo that is being transported can impose one or more requirements that need to be met by the driving/routing decisions in order to ensure successful transport of the cargo. For example, if an autonomous vehicle or a semi-autonomous vehicle is transporting cargo that is perishable, the vehicle will need to make appropriate driving/routing decisions so that the cargo does not spoil in transit.

However, current autonomous/semi-autonomous vehicles make driving decisions and routing decisions primarily based upon considerations relating to collision avoidance. These current autonomous/semi-autonomous vehicles do not take into account considerations relating to the type of cargo that is being carried. In other words, current autonomous/semi-autonomous vehicles operate in a manner that is agnostic of their cargo and stowage and thus do not appropriately adapt driving/routing decisions to ensure successful transport of the cargo.

Turning now to an overview of the aspects of the invention, one or more embodiments of the invention are directed to an adaptive driving system that determines a type of cargo that is being transported and adapts driving/routing decisions based at least on the determined cargo. The above-described aspects of the invention address the shortcomings of the prior art by considering the type of cargo that is being carried when controlling an autonomous or a semi-autonomous vehicle.

FIG. 1 depicts an adaptive driving system in accordance with one or more embodiments of the invention. Adaptive driving system 100 can be implemented by an electronic control unit and/or an autonomous/semi-autonomous vehicle controller, for example. In order to implement a system of adaptive driving 100 based at least on a determination of a type or a characteristic of transported cargo, one or more embodiments of the invention can implement one or more subsystems (110-130). A routing subsystem 110 can be configured to perform the function of adapting a route based at least on a determined type or characteristic of the transported cargo. A driving style subsystem 120 can be configured to perform the function of adapting a driving style based at least on the determined type or characteristic of the transported cargo. An internal control subsystem 130 can be configured to perform the function of adapting at least one internal system based at least on the determined type or characteristic of the transported cargo.

With regard to routing subsystem 110, subsystem 110 can be configured to plan the route in accordance with one or more considerations. One consideration upon which the route can be adapted relates to minimizing encounters with one or more weather conditions and road conditions. For example, based at least on a determination that the cargo is hazardous material, the subsystem of one or more embodiments of the invention can be configured to adapt a route to avoid as many overpasses, bridges, and roads that are prone to flooding as possible. It may be desirable to avoid overpasses and/or bridges because overpasses and bridges can freeze or become slippery, which can increase the chances of spillage of cargo. During rainy weather, it may be desirable to avoid certain roads that are more prone to flooding in order to prevent the cargo from being stuck within floodwaters.

Another consideration upon which the route can be planned relates to avoiding areas of heavy traffic and high population density. For example, based at least on the determination that the cargo is hazardous material, the subsystem of one or more embodiments of the invention can be configured to adapt a route to avoid traffic and avoids populated areas. By avoiding traffic and heavily-populated areas, the hazardous material can be transported with less risk to human health.

As another example, based at least on a determination that a transported cargo is fragile, subsystem 110 is configured to adapt the routing to avoid sudden jerks in movement that can cause damage to the fragile cargo.

Another consideration upon which the route can be planned relates to a type of road. For example, based at least on a determination that the cargo is hazardous material or fragile material, one or more embodiments of the invention can be configured to adapt a route to include roads that are straight and wide as opposed to roads that include numerous turns and/or that include sharp turns. In view of the above, subsystem 110 can be configured to adapt the route based at least on the transported cargo where subsystem 110 can be configured to plan the route in accordance with one or more of the above-described considerations.

With regard to driving style subsystem 120, subsystem 120 can be configured to adaptively drive the vehicle in accordance with one or more considerations. For example, based at least on a determination that the cargo is hazardous or fragile, one or more embodiments of the invention can adapt the driving style to avoid sudden acceleration and deceleration and to slow down before a sharp turn. One or more embodiments of the invention can configure the driving style to avoid anticipated jerking movements.

Additionally, based at least on the determination that the cargo is hazardous or fragile, one or more embodiments of the invention can also adapt the driving style in order to maintain a safe driving distance from neighboring vehicles. Based at least on a determination that the vehicle's cargo is hazardous or fragile, one or more embodiments of the invention can also notify the vehicle's neighboring drivers (through a vehicle-to-vehicle communication network) of the presence of fragile/hazardous cargo so that the neighboring vehicles are aware of the driving style of the cargo-transporting vehicle. The neighboring vehicles can also modify their own driving style in response to the received vehicle-to-vehicle communication.

With regard to the internal control subsystem 130, subsystem 130 can, for example, be configured to adaptively control one or more environmental conditions in which the cargo is stored. Based at least on a determination the cargo needs to be stored in accordance with one or more environmental conditions, the subsystem 130 can be configured to control the storage environment to ensure that the necessary conditions are met. For example, one or more embodiments of the invention can be configured to control the temperature of the storage environment based at least on the cargo. Further, one or more embodiments of the invention can control the conditions of the storage environment based at least on the cargo, how slow or fast the vehicle is moving, and/or an expected time of arrival. Further, based at least on a determination that the cargo is hazardous and/or fragile, the subsystem can be configured to control the amount of vibration/jitter that is experienced by the storage environment.

Subsystem 130 can also control at least one of a motion controller system that includes one or more of a motion anticipator, a motion calculator, a smoothing filter, and/or a motion generator. The motion controller system of one or more embodiments of the invention can be configured to perform detection of cargo movement, and the motion controller system can be configured to adjust motion of the cargo based at least on the detected cargo movement, as described in more detail below.

Figure 2:
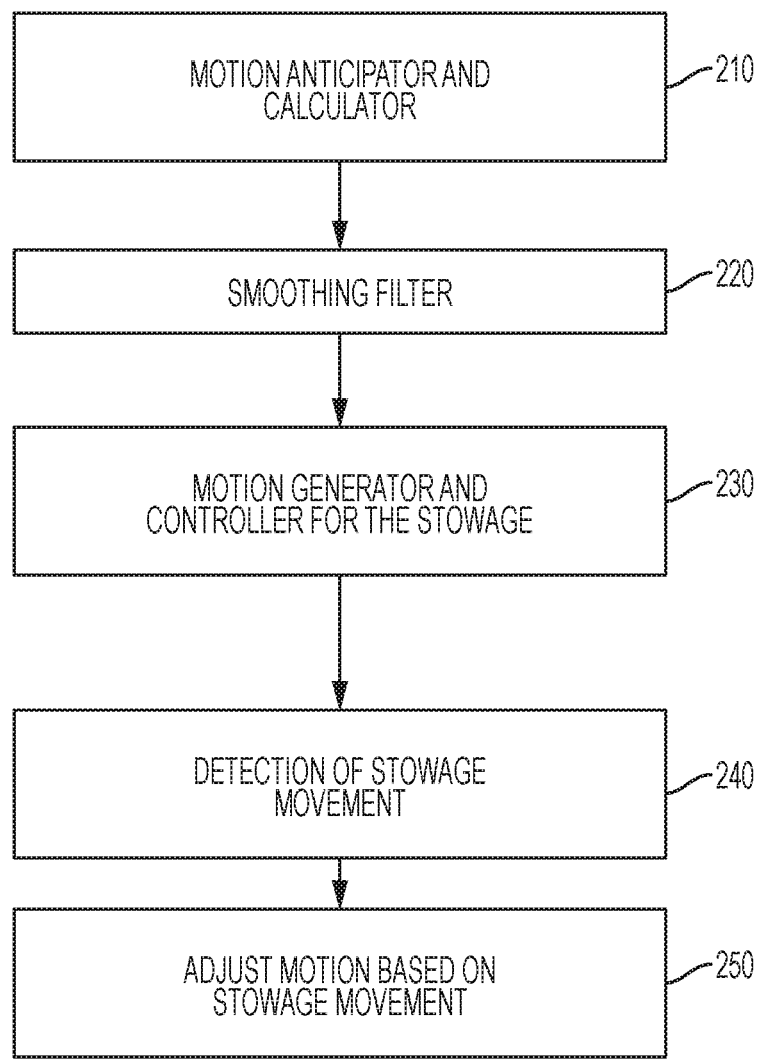
FIG. 2 depicts functions that can be performed by an internal control subsystem of one or more embodiments of the invention.

FIG. 2 depicts functions that can be performed by an internal control subsystem 130 (shown in FIG. 1) of one or more embodiments of the invention. At 210, a motion anticipator can anticipate that the vehicle is about to experience a motion, and the motion calculator can calculate an amount of anticipated motion. The motion anticipator of one or more embodiments of the invention can anticipate that a motion is about to occur based at least on an approaching part of a route (i.e., an approaching curve and/or an approaching change in terrain). The motion anticipator can also be configured to determine that a motion is about to occur based at least on current traffic data received from the Transportation Security Administration (TSA), Google Maps, and/or any other traffic data sources. The motion anticipator can also be configured to determine that a motion is about to occur based at least on historical data collected by TSA for each stretch of the route. The historical data can be information regarding the roughness of the road.

Figure 3:
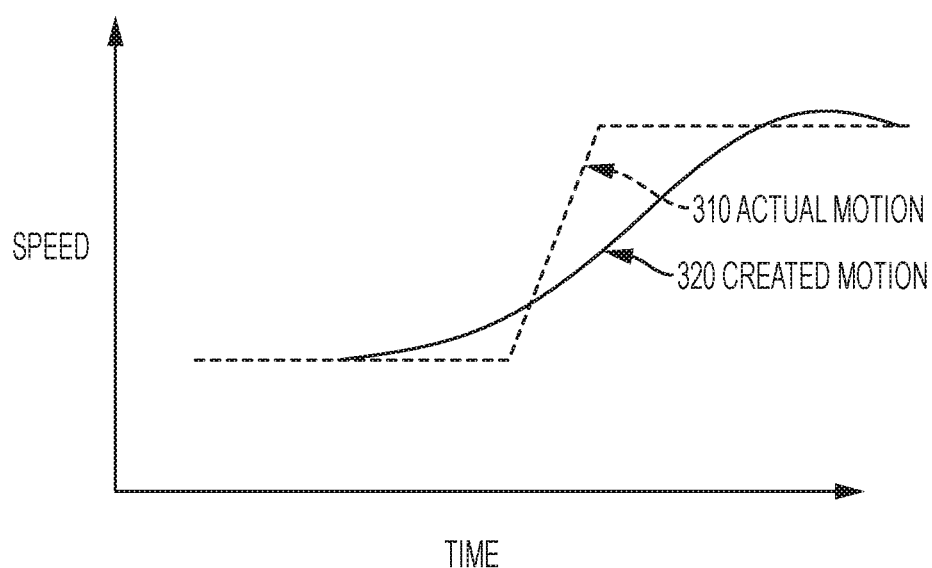
FIG. 3 depicts applying a smoothing filter to an anticipated motion in accordance with one or more embodiments of the invention.

At 220, one or more embodiments of the invention can apply a smoothing filter to the anticipated motion in order to reduce sharp movements that are experienced by the cargo. Referring to FIG. 3, the cargo can be anticipated to experience an actual motion 310 that includes a sharp acceleration and a sharp deceleration, for example. However, one or more embodiments of the invention can generate a desired created motion 320 by applying a smoothing filter to the actual motion 310. Upon generating desired created motion 320, one or more embodiments of the invention attempt to adapt the movement of the vehicle to match desired created motion 320 in order to provide a smoother drive for the transported cargo. At 230, a motion generator and controller can generate motion so that the vehicle's motion matches the desired created motion 320.

At 240, one or more embodiments of the invention can also detect movement that is experienced by the cargo/stowage. One or more embodiments of the invention can be configured to calculate a current motion and a current acceleration that is being experienced by the cargo. The motion/acceleration can be determined using a gyroscope, for example. One or more embodiments of the invention can also determine the motion/acceleration based at least on a pressure that is applied upon an accelerator and/or applied upon a brake pad. One or more embodiments of the invention can also determine the motion/acceleration based at least on one or more accelerometers.

At 250, one or more embodiments of the invention can be configured to adjust motion of the stowage/cargo based at least on the detected stowage/cargo movement. The motion controller can adjust motion of the stowage/cargo using a Proportional-Integration-Derivative (PID) controller. For example, the PID controller can be configured to control a motion of a passenger seat. The PID controller can be configured to use a feedback sensor to control movement of cargo based at least on the perceived personal comfort of human passengers that are being transported along with the cargo. With one or more embodiments of the invention, the feedback sensor of one or more embodiments of the invention can be configured to detect personal discomfort experienced by one or more passengers via facial expressions, biometric information (such as, for example, galvanic/sweating responses), and/or other body gestures, for example.

One or more embodiments of the invention can use some or all of the above-described subsystems 110-130 to successfully transport certain cargo that is difficult to transport. For example, the autonomous or semi-autonomous vehicle of one or more embodiments of the invention can be assigned to deliver a wedding cake. In general, transporting a wedding cake can present some specific difficulties. First, routing subsystem 110 (of FIG. 1) is configured to plan a route to transport the cake during a specific window of time because the wedding cake needs to be transported shortly after the cake is created in order to preserve the freshness of the cake. Further, the cake needs to be transported during the specific window of time because the wedding cake needs to be delivered to the wedding ceremony shortly before the ceremony begins. Second, driving style subsystem 120 is configured to adapt a driving style to avoid sudden jerks and turns because the wedding cake can have intricate designs that cannot be damaged during the transporting. Third, internal control subsystem 130 is configured to control internal systems to control the storage temperature to be sufficiently cool because the wedding cake can be adorned with frosting/decorations that cannot be allowed to melt during the transporting.

In view of the above, one or more embodiments of the invention can provide a safe and secure method to transport delicate and hazardous material via autonomous/semi-autonomous vehicles by providing an appropriate route, an appropriate driving style, and/or an appropriate set of internal controls.

Figure 4:
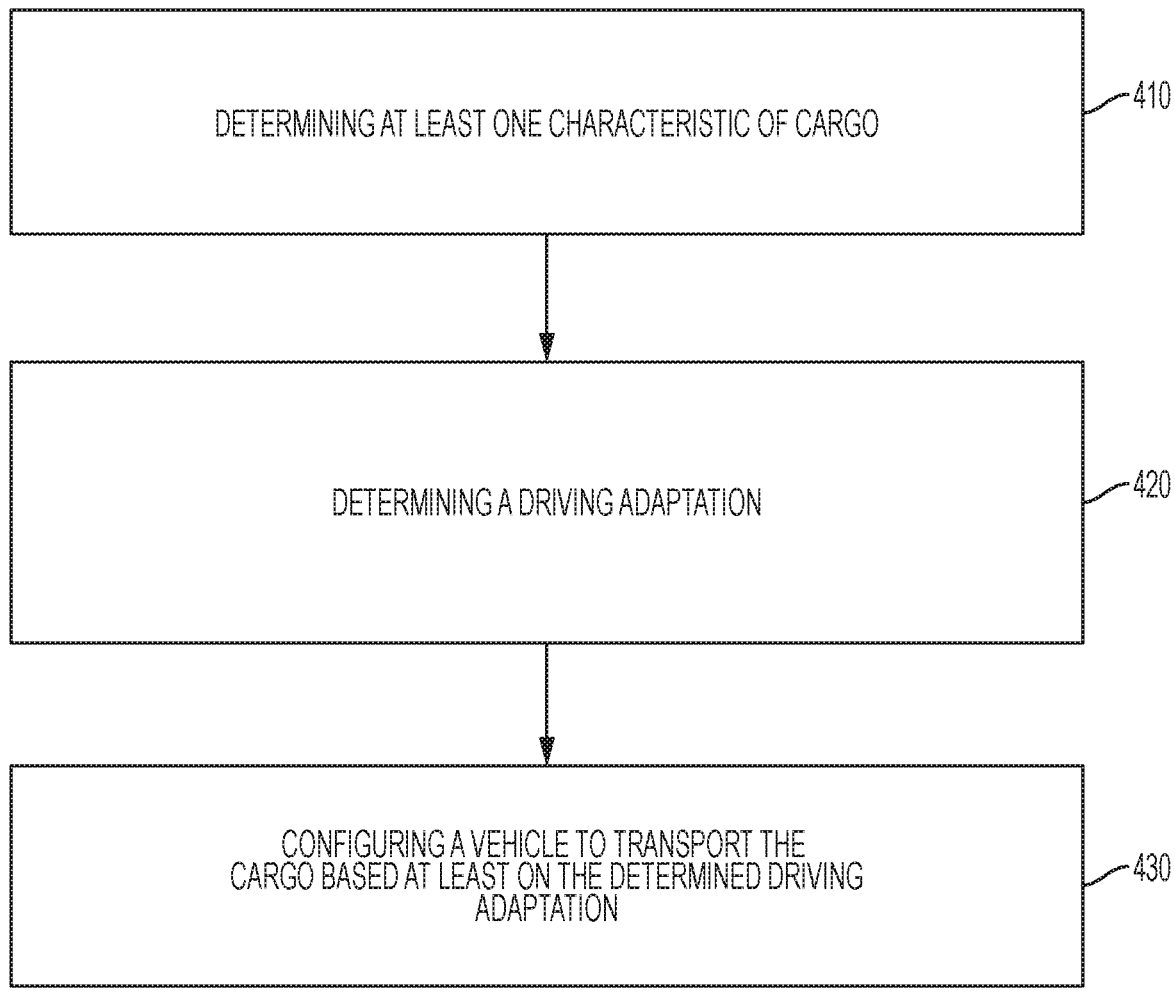
FIG. 4 depicts a flowchart of a method in accordance with one or more embodiments of the invention.

FIG. 4 depicts a flowchart of a method in accordance with one or more embodiments of the invention. In one or more embodiments of the present invention, the method can be performed by an electronic control unit and/or a system controller of an autonomous vehicle or a semi-autonomous vehicle, for example. The method includes, at block 410, determining, by an electronic control unit, at least one characteristic of cargo that is transported by an autonomous vehicle or a semi-autonomous vehicle. The method also includes, at block 420, determining a driving adaptation based at least on the at least one characteristic. The driving adaptation is selected from the group consisting of a routing adaptation, a driving style adaptation, and an internal control adaptation. The method also includes, at block 430, configuring the vehicle to transport the cargo based at least on the determined driving adaptation.

Figure 5:
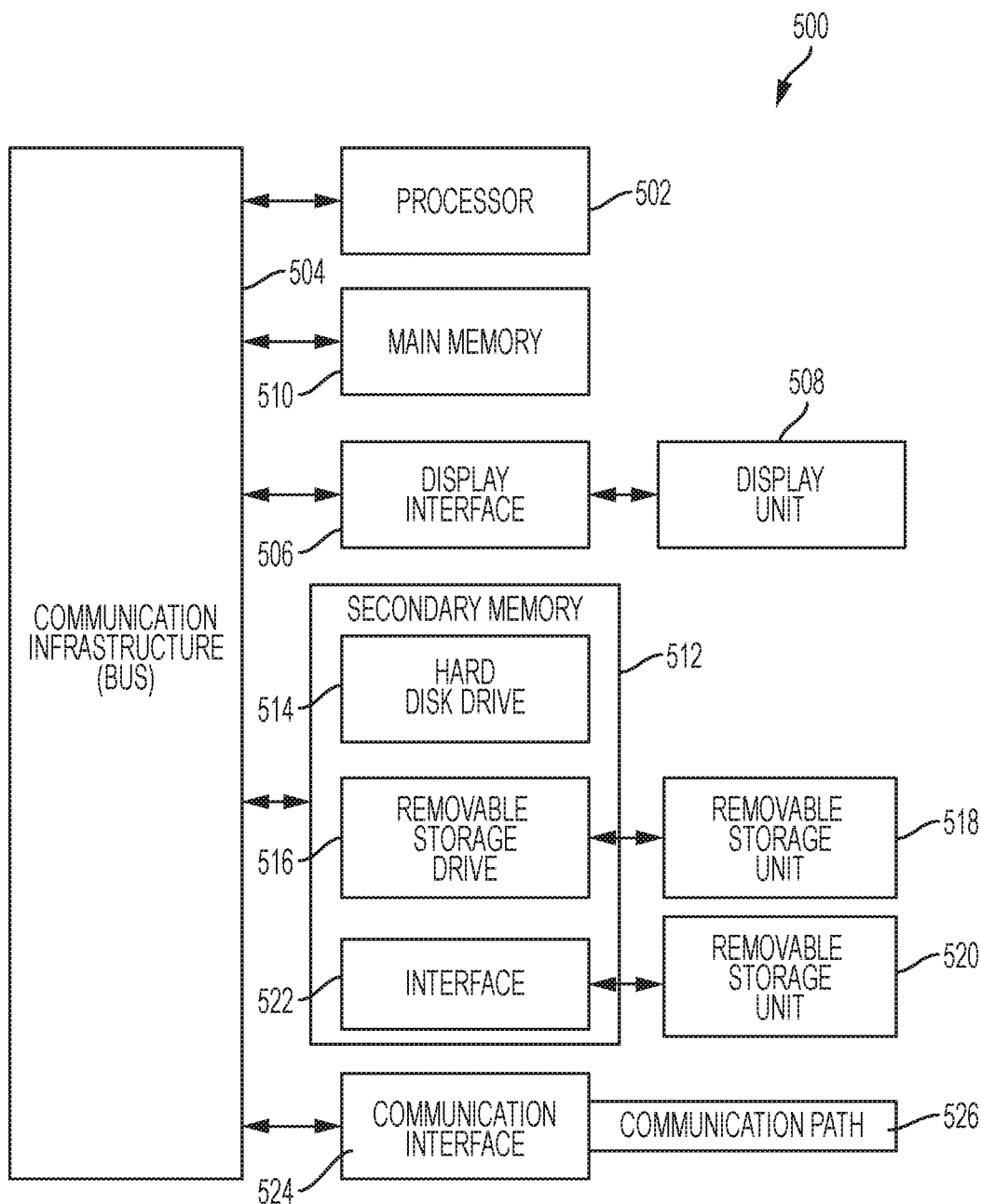
FIG. 5 depicts a high-level block diagram of a computer system, which can be used to implement one or more embodiments of the invention.

FIG. 5 depicts a high-level block diagram of a computer system 500, which can be used to implement one or more embodiments of the invention. Computer system 500 can correspond to, at least, an electronic control unit and/or an autonomous/semi-autonomous vehicle controller, for example. Computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments of the invention, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via a communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the foregoing detailed description that one or more embodiments provide technical benefits and advantages.

Figure 6:
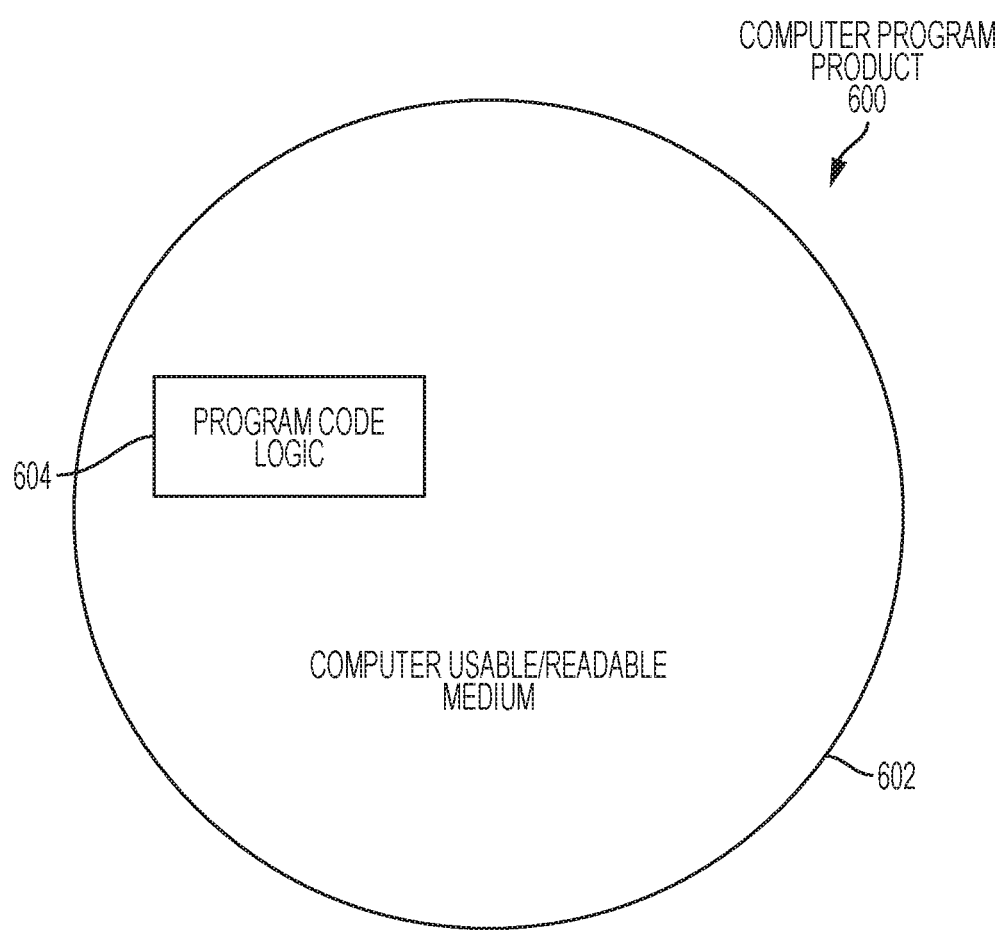
FIG. 6 depicts a computer program product in accordance with one or more embodiments of the invention.

FIG. 6 depicts a computer program product 600, in accordance with an embodiment. Computer program product 600 includes a computer-readable storage medium 602 and program instructions 604.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method, the method comprising:
   determining, by an electronic control unit, at least one characteristic of cargo that is transported by an autonomous vehicle or a semi-autonomous vehicle;
   determining a driving adaptation based at least on the at least one characteristic, wherein the driving adaptation is selected from a group consisting of a routing adaptation, a driving style adaptation, and an internal control adaptation; and
   configuring the vehicle to transport the cargo based at least on the determined driving adaptation.

2. The computer-implemented method of claim 1, wherein the determining the at least one characteristic of cargo comprises determining that the cargo comprises hazardous cargo.

3. The computer-implemented method of claim 1, wherein the determining the at least one characteristic of cargo comprises determining that the cargo comprises fragile cargo.

4. The computer-implemented method of claim 1, wherein the determining the driving adaptation comprises determining a routing adaptation that reduces encounters with inclement weather conditions, bridges, and/or heavily-populated areas.

5. The computer-implemented method of claim 1, wherein the determining the driving adaptation comprises determining a routing adaptation that reduces encounters with sharp turns.

6. The computer-implemented method of claim 1, wherein the determining the driving adaptation comprises determining a driving style adaptation that avoids sudden acceleration and sudden deceleration.

7. The computer-implemented method of claim 1, wherein the determining the driving adaptation comprises determining an internal control adaptation that controls a storage temperature based at least on the cargo.

8. A computer system comprising:
a memory; and
a processor system communicatively coupled to the memory;
the processor system configured to perform a method comprising:
determining at least one characteristic of cargo that is transported by an autonomous vehicle or a semi-autonomous vehicle;
determining a driving adaptation based at least on the at least one characteristic, wherein the driving adaptation is selected from a group consisting of a routing adaptation, a driving style adaptation, and an internal control adaptation; and
configuring the vehicle to transport the cargo based at least on the determined driving adaptation.

9. The computer system of claim 8, wherein the determining the at least one characteristic of cargo comprises determining that the cargo comprises hazardous cargo.

10. The computer system of claim 8, wherein the determining the at least one characteristic of cargo comprises determining that the cargo comprises fragile cargo.

11. The computer system of claim 8, wherein the determining the driving adaptation comprises determining a routing adaptation that reduces encounters with inclement weather conditions, bridges, and/or heavily-populated areas.

12. The computer system of claim 8, wherein the determining the driving adaptation comprises determining a routing adaptation that reduces encounters with sharp turns.

13. The computer system of claim 8, wherein the determining the driving adaptation comprises determining a driving style adaptation that avoids sudden acceleration and sudden deceleration.

14. The computer system of claim 8, wherein the determining the driving adaptation comprises determining an internal control adaptation that controls a storage temperature based at least on the cargo.

15. A computer program product comprising:
a computer-readable storage medium having program instructions embodied therewith, the program instructions readable by a processor system to cause the processor system to perform a method comprising:
determining, by an electronic control unit, at least one characteristic of cargo that is transported by an autonomous vehicle or a semi-autonomous vehicle;
determining a driving adaptation based at least on the at least one characteristic, wherein the driving adaptation is selected from a group consisting of a routing adaptation, a driving style adaptation, and an internal control adaptation; and
configuring the vehicle to transport the cargo based at least on the determined driving adaptation.

16. The computer program product of claim 15, wherein the determining the at least one characteristic of cargo comprises determining that the cargo comprises hazardous cargo.

17. The computer program product of claim 15, wherein the determining the at least one characteristic of cargo comprises determining that the cargo comprises fragile cargo.

18. The computer program product of claim 15, wherein the determining the driving adaptation comprises determining a routing adaptation that reduces encounters with inclement weather conditions, bridges, and/or heavily-populated areas.

19. The computer program product of claim 15, wherein the determining the driving adaptation comprises determining a routing adaptation that reduces encounters with sharp turns.

20. The computer program product of claim 15, wherein the determining the driving adaptation comprises determining a driving style adaptation that avoids sudden acceleration and sudden deceleration.

* * * * *